Dec. 16, 1924.  A. F. POOLE  1,519,328
CALCULATING MACHINE
Filed Nov. 27, 1922   3 Sheets-Sheet 3
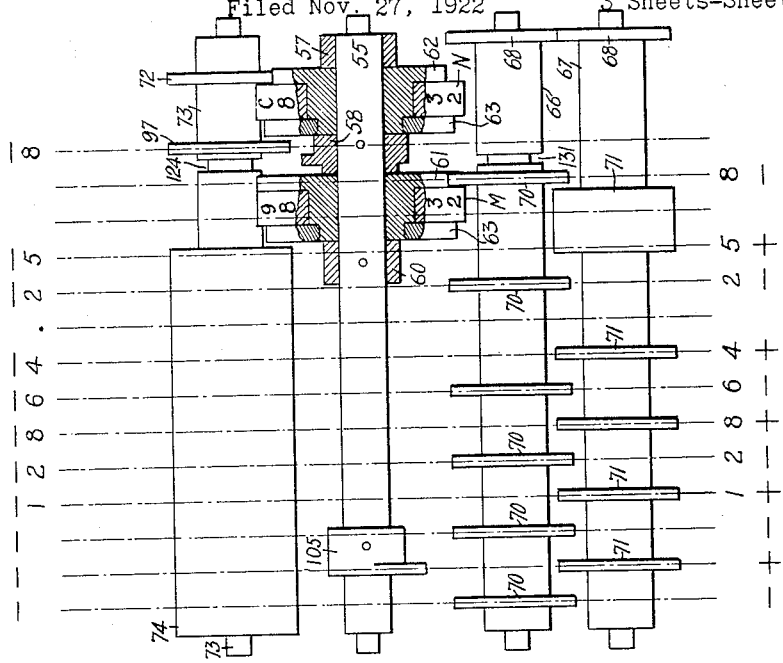
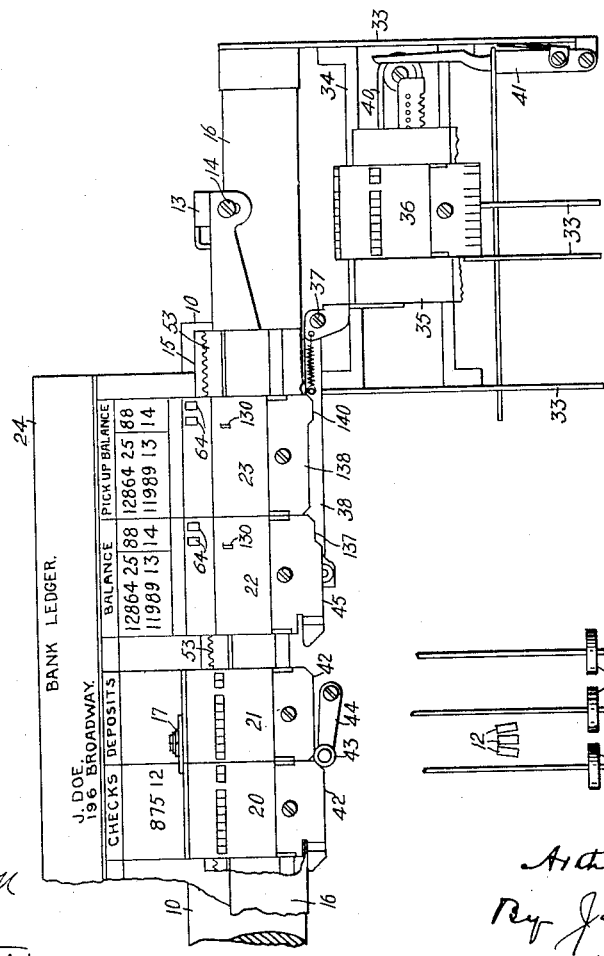
WITNESSES
Lillian Nelson
R. H. Strother
INVENTOR
Arthur F. Poole
By Jacob Felbel
HIS ATTORNEY Patented Dec. 16, 1924.

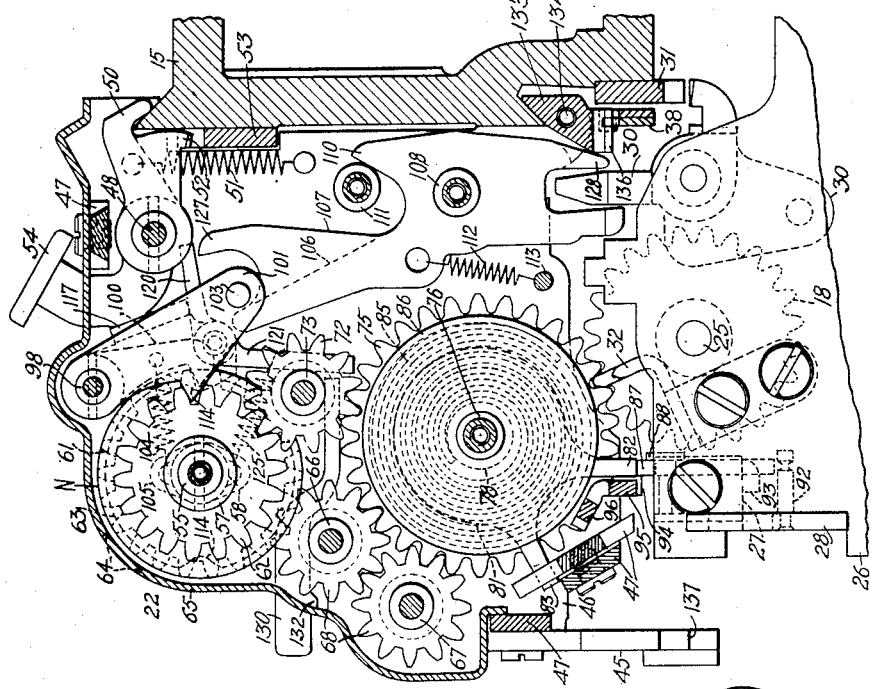
Dec. 16, 1924.
A. F. POOLE
CALCULATING MACHINE
Filed Nov. 27, 1922
1,519,328
3 Sheets-Sheet 1

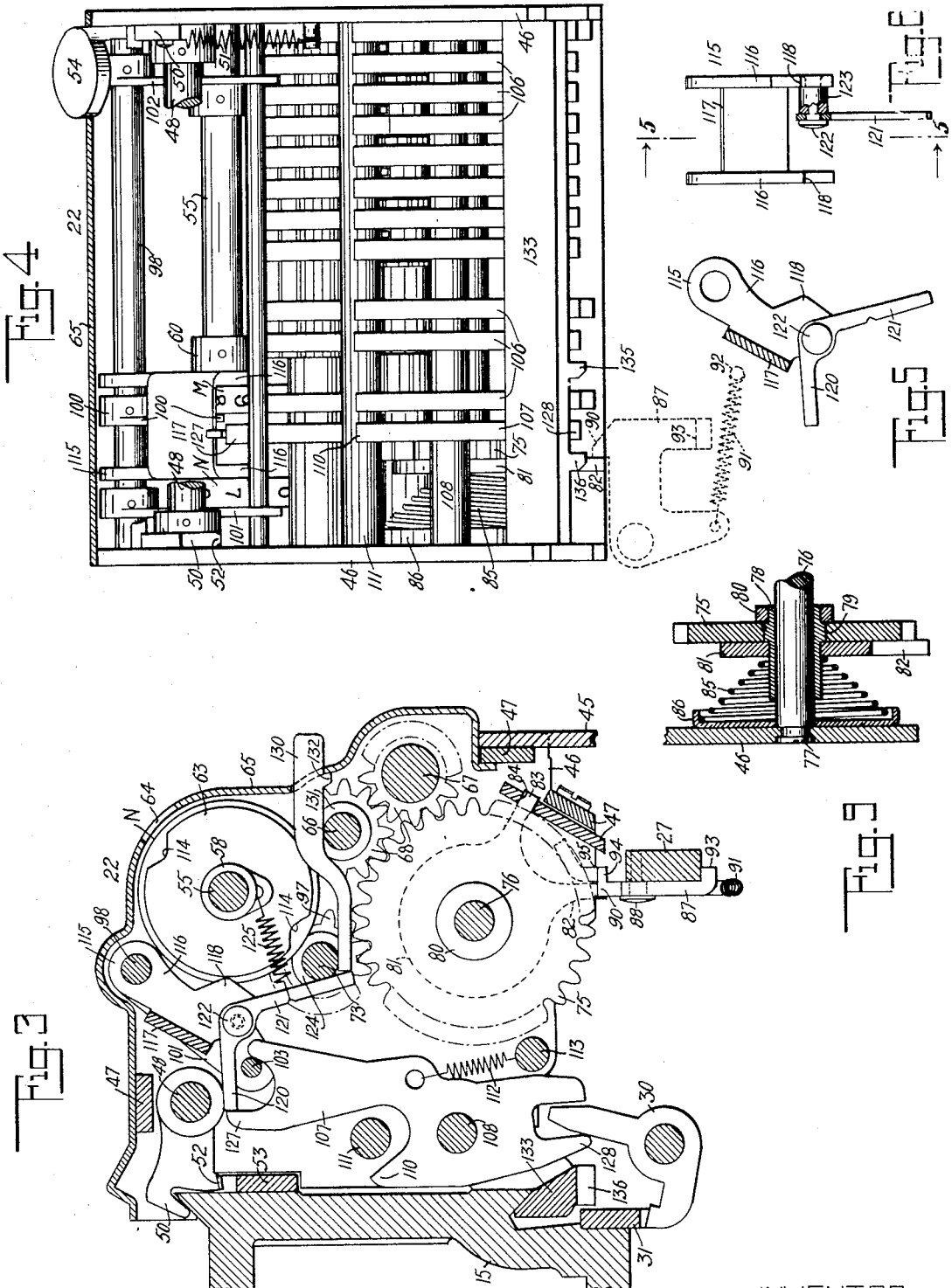

1,519,328

UNITED STATES PATENT OFFICE.

ARTHUR F. POOLE, OF PELHAM MANOR, NEW YORK, ASSIGNOR TO REMINGTON ACCOUNTING MACHINE CORPORATION, OF NEW YORK, N. Y., A CORPORATION OF NEW YORK.

CALCULATING MACHINE.

Application filed November 27, 1922. Serial No. 603,388.

*To all whom it may concern:*

Be it known that I, ARTHUR F. POOLE, a citizen of the United States, and resident of Pelham Manor, in the county of Westchester and State of New York, have invented certain new and useful Improvements in Calculating Machines, of which the following is a specification.

My invention relates to calculating machines, and it has for its principal object to provide improved mechanism for computing a short function or symbol which is characteristic of a number or of the digits of said number.

In my prior application for Letters Patent for registering mechanism filed November 17, 1821, Serial No. 515,887, there is described mechanism whereby in case the operator of a machine, such, for example, as an accounting machine, incorrectly copies from a paper a number of previously printed thereon he may be immediately notified of his error as, for example, by the locking-up of the machine. The present invention may be considered to be in the nature of an improvement on or modification of the machine described in said prior application. Some of the features of the present invention are, however, of wider application than to the particular class of computing or registering mechanism just referred to.

Briefly stated, the mechanism described in my said prior application is attached to or constitutes part of an accounting machine, and when a number is computed by said accounting machine said mechanism computes a short function or symbol characteristic of that number, which function or symbol is printed in conjunction with the number itself. When at the next operation of the machine on that same problem said number is copied or re-entered into the accounting machine, the symbol previously computed and printed beside the number is also entered into the calculating machine by the operator. When the number itself was re-entered into the machine the symbol computing mechanism re-computed the same symbol that had been computed at the previous or original operation, and the mechanism is so constructed that when the printed symbol is copied into the machine from the paper the machine will be locked up in case said copied symbol does not agree with the symbol just computed. If the number has been incorrectly copied the newly computed symbol will not correspond with the one printed on the paper and when said printed symbol is copied the machine will be locked up or the operator otherwise notified of the error.

A subsidiary object of the present invention is, in that class of calculating machinery where there is a relative travel from one denominational position to another between a master wheel and the several denominational wheels of the registering mechanism, to provide novel means for transmitting the motion of said master wheel to said denominational register wheels. This is done in the present instance by means of a jumping transmitting wheel mounted in the register itself and throughout at least the extent of one computing column or zone held in mesh with the regular master wheel of the machine.

To the above and other ends, my invention consists in certain features of construction and combinations and arrangements of parts all of which will be fully set forth herein and particularly pointed out in the claims.

In the accompanying drawings,

Figure 1 is a front elevation partly broken away and with the casing plate removed and showing a registering mechanism constructed in accordance with my invention together with a few associated parts of an accounting machine.

Figure 2 is a right-hand side elevation of the same with the right-hand casing plate of the register sectioned away.

Figure 3 is a front to rear vertical sectional view about on the line 3—3 of Fig. 1.

Figure 4 is a rear elevation of the registering mechanism with part of the casing plate sectioned away and with some parts broken away.

Figure 5 is a left-hand side elevation of a detail in section on line 5—5 of Fig. 6.

Figure 6 is a front view partly in section of said detail.

Figure 7 is a more or less diagrammatic front elevation of certain parts of a Remington accounting machine having my invention embodied therein.

Figure 8 is a developed diagrammatic representation of the trains of gearing in the registering mechanism whereby the symbol is computed.

Figure 9 is a vertical transverse section of the jumping wheel and some of its associated parts, looking toward the front of the machine.

For the purpose of illustrating one form of my invention in detail I have shown said invention embodied in a Remington accounting machine of which only fragments are shown in the drawing, the whole machine being well-known in the art, having been for a number of years extensively in use and being fully described in the patent to John C. Wahl, No. 1,270,471 dated June 25, 1918.

This machine includes a Remington typewriter of which the only parts represented in the drawing (Fig. 7) are the platen 10, numeral keys 11, and printing types 12. Said platen is mounted in a carriage from which arms 13 project toward the front of the machine and are connected by pin-and-slot connections 14 with the main truck 15 of the Wahl computing mechanism. The stationary framework of said mechanism is secured to the top plate of the typewriter and it includes as one of its principal parts a casting 16 extending right and left across the front upper part of the typewriter. At about the middle of the machine, indicated in Fig. 7 by the pointer 17, this bar has mounted thereon three rollers or wheels which support and guide the truck 15, said truck traveling toward the left and right under the control of the typewriter carriage through the connections 13, 14. Situated in the same vertical plane with said pointer and said rollers is the main master wheel 18 of the machine.

I have indicated in Fig. 7 two vertical totalizers 20 and 21 mounted on the truck 15 and also two of my symbol-computing registers 22 and 23, said totalizers and registers corresponding in position respectively with four columns on a bank ledger sheet 24 carried by the platen 10 and its co-operating paper feed devices.

The main master wheel 18, Figs. 1 and 2, is rigid on a shaft 25 journaled at its end in frame plates 26 projecting forward from the casting 16. Only one of these several frame plates is shown, it being connected with another at the left of it by a cross bar 27; and a plate 28 secured to said cross bar 27 is also a part of the Remington construction which will be recognized by persons familiar with that machine.

Also pivotally mounted in the frame plates 26 is a master dog 30 having an upstanding arm that co-operates with certain devices in the totalizers 20 and 21 and in the registers 22 and 23 and having also a rearwardly extending arm adapted when one of the keys 11 is operated to enter one of the notches of a toothed rack 31 secured to the lower part of the truck 15.

The Remington mechanism also includes an aligning and locking tooth 32 situated just to the right of the master wheel 18 and secured to one of the frame plates 26.

The cross-footing mechanism of the Remington accounting machine is for the most part mounted in certain frame plates 33, Fig. 7, secured to the casting 16. Among other things these plates support a stationary rail or track-bar 34 for the jumping cross truck 35 on which is mounted the cross totalizer 36 which is operated by a cross master wheel and other mechanism. The cross truck 35 has pivoted thereto at 37 a hook 38 by which said cross truck can become coupled up to the vertical totalizers and also as will hereinafter appear to my symbol computers 22 and 23, so as to travel temporarily with the main carriage. At the end of a computing zone, said hook is cammed loose by mechanism disclosed in the Wahl patent hereinbefore referred to and the cross truck 35 is drawn back by means of a spring 40 to normal position against a stop lever 41.

All of the above parts of the Remington accounting machine are barely indicated on the drawings and mentioned in the specification partly because that machine is well known in the art and partly because as far as the principal features of my invention are concerned the machine to which said invention is applied may be almost any sort of calculating machine in which there is relative travel between a register and a master actuator.

The machinery shown in Fig. 7 is arranged for the posting of a loose-leaf bank ledger, one sheet of which is shown in position in the machine. This ledger sheet includes four vertical columns headed respectively "Checks", "Deposits", "Balance", and "Pick-up Balance." When this sheet is in its place in the loose-leaf book, the last item in it is in the balance column and it indicates the amount of the depositor's balance after the last recorded transaction. In case a deposit has been made or a check cashed on this account this sheet is put back into the machine and the balance is copied from the third column into the fourth column, just to the right thereof, and the amount of said balance is by such act of copying automatically added in the cross totalizer 36. The typewriter carriage is then drawn back to the right and the platen line spaced and then the amounts of any checks and deposits are written in their respective columns and added in the totalizers 20 and 21. Amounts of checks are automatically subtracted and deposits automatically added in the cross totalizer 36 by means which include certain cams 42 mounted on the respective totalizers and adapted to control a follower roller 43 mounted on a lever arm 44 which is connected through well-known mechanism with the change gear mechanism of the cross master wheel. This mechanism is so constructed that when a deep cam 42 like that shown on totalizer 20 depresses roller 43 to its full extent the said cross master wheel is set for subtraction; when a high cam like that shown on totalizer 21 is employed or when the totalizer carries no cam at all the rise of the roller 43 to its highest position sets the cross master wheel for addition; and when a cam of intermediate depth sets said roller in a middle position the cross master wheel is disconnected and does not operate.

The register 22 corresponding to the balance column has a cam 45 the major part of which is of a depth to cause subtraction in the cross footer so that when a balance is computed by adding the pick-up balance and the deposits and subtracting the checks, said balance when copied in the balance column is subtracted from itself in the cross totalizer 36 and said cross totalizer is thereby set to zero ready for a new operation on some other ledger sheet.

It will be perceived that the operator of this machine is constantly putting new ledger sheets into the machine and copying therefrom in the pick-up balance column the old balance as recorded in the balance column and that the accuracy of the work depends for one thing on the correctness of this copying of previously printed numbers. This particular piece of work is therefore a suitable one in connection with which to illustrate my invention whose principal object it is to insure the correctness of the copying of previously printed members.

When the carriage is in position to write the balance as indicated on the cross totalizer 36 my symbol computing register 22 is over the main master wheel 18 ready to be operated thereby, and similarly when the pick-up balance is copied from the paper my register 23 is in position to be operated. These two registers are identical in internal construction, except in one small particular which will be hereinafter described.

Each of the symbol computing reg sters 22 and 23 is framed much after the fashion of an ordinary Remington Wahl totalizer. It comprises side plates 46 adapted to be dove-tailed onto the truck 15 the same as said totalizer, and said frame plates are rigidly connected together by certain cross bars 47 similar in construction and position to those of the Wahl totalizer and also by certain rods or shafts as will hereinafter appear. A rock shaft 48 pivoted at its ends in the side plates 46 has the usual hooks 50 adapted to be pressed into engagement with the truck 15 by a spring 51 and one of said hooks carries the usual tooth 52 adapted to interlock with the rack 53 ordinarily mounted on the front face of the truck, these securing parts being controlled by a finger piece 54, similar in a general way to the one employed in the Wahl totalizer but in the present instance situated at the left-hand side of the register. By the means described this register can be mounted on the truck and adjusted along it to any desired letter space position the same as a Wahl totalizer.

The mechanism can be arranged to compute a symbol expressed in one or more digits or other distinguishing characters. The register shown in the drawings is arranged to compute a symbol in two digits, one of which is indicated on a dial M and the other on a dial N, said dials being each journaled on a transverse shaft or frame rod 55 which may be conveniently secured to the side plates 46 by screws, 56, Fig. 1. Endwise motion of the dials is prevented by three collars 57, 58 and 60. The detail construction of these dials can of course be of any suitable sort but as here shown the dials M and N are respectively provided with gear wheels 61 and 62, each at the right of its dial, the dial itself being mounted on the hub of said gear wheel; and on a reduced part of said hub there is also mounted at the left of each dial a disk 63. The number of teeth in the gear wheels 61 and 62 can be varied according to the particular function or symbol adopted for use. In the present instance the dial M is designed to compute the 11-function of a number and wheel 61 is accordingly made with twenty-two teeth; and the dial N is designed to compute the 9-function of the same number and its gear 62 is accordingly made with eighteen teeth. The dial M has on its periphery two series of numbers, 0, 1, 2, 3, 4, 5, 6, 7, 8, 9, X; and the dial N has two series of numbers, 0, 1, 2, 3, 4, 5, 6, 7, 8. These numbers can be read through sight-openings 64 in a casing plate 65 which covers the mechanism.

The mechan sm for actuating the dial M includes two shafts 66 and 67, each journaled at its ends in the side plates 46, said shafts being situated below and somewhat forwardly of the shaft 55; and said two shafts are geared together by two pinions 68, one fast on each of the shafts, said pinions here shown as being at the extreme right-hand ends of the shafts.

Distributed at suitable intervals along the shaft 66 and rigid thereon or integral therewith are a number of pinions 70 of which one meshes with and drives the gear 61 of the dial M. Suitably distributed along the shaft 67 and fast thereon or integral therewith is a series of pinions 71, these alternating with the pinions 70 as plainly shown in Fig. 8. The construction is such that in case any actuating means, such as a gear or master wheel turning always in the same direction, engages the pinions 70 and 71 said wheel will through the gearing described turn the dial M, the pinions 70 turning said dial in one direction and the pinions 71 turning it in the opposite direction. In the diagram, Fig. 8, denominational positions are indicated by the vertical dot-and-dash lines. It will be noted that one of these lines passes through each of the pinions 70 and 71 and that there is also a line that passes through no pinion, this line corresponding to the decimal point, the machine in this particular instance being arranged for United States money.

If the pinions 70 and 71 be actuated in the manner described, the dial M will be turned one way for every other digit of a number, and the opposite way for the alternate digits. This dial will therefore compute the 11-function of the number, that is to say, if it stood initially at zero its final position will be displaced from zero a number of spaces equal to the difference between the sum of the digits in even numbered denominational positions and the sum of the digits in odd numbered denominational positions. This difference is equal to the remainder that would be obtained after dividing the number by eleven. For example, if the number was "235" the sum of the odd numbered digits "2" and "5" is 7, the even numbered digit is "3" and the difference is 4. Eleven is contained into "235" twenty-one times with a remainder of 4. In case that number "235" was written the dial M would be displaced four spaces from its initial zero position.

The means for operating the dial N comprises a pinion 72 meshing with the gear 62 and fast on or integral with a shaft 73, which shaft is journaled at its ends in the frame plates 46 below and somewhat back of the shaft 55. This shaft 73 has fast thereon or integral therewith a long pinion 74 of a length equal to the entire range of the number whose symbol is to be computed. If therefore as the register steps along through a computing column over the master wheel 18 and if means be provided to turn this pinion 74 in unison with said master wheel, then the dial N will be turned in accordance with each and every digit of the number entered in that calculating zone, and always in the same direction. This dial will therefore be turned to an extent equal to a sum of all of the digits of the number. As the wheel 62 has eighteen teeth and as the numerals on the periphery of the dial end are arranged in two groups of nine digits each this wheel after the recording of a number will indicate the nine function of that number, that is to say, the remainder that would be obtained after dividing the number by nine.

It may be here remarked that although in this machine the symbol computed by the M and N dials consists of two actual statable functions of the number, this is by no means essential to the carrying out of my invention. The gearing may be arranged to compute a symbol according to any suitable rule even though that rule may be entirely arbitrary. In case an arbitrary rule is used the symbol may not be a statable function of the number but it will be a statable function of the series of digits which go to make up the number in written form.

In order to drive the pinions 70, 71 and 74 according to the rules above referred to, I provide in the register-casing a jumping transmitting wheel 75. This wheel normally partakes of the travel of the typewriter carriage, the truck 15 and the balance of the register 22, which travel is of an extent to cover several computing columns or zones; but said wheel is also capable of a travel in and relative to the register as great as the width of a computing zone including the symbol, as will more clearly appear hereinafter. The wheel 75 is in effect slidably journaled on a shaft or rod 76 secured at its ends to the frame plates 46 by means of screws 77. The shaft 76 may conveniently occupy the same position in the register 22 as is occupied in an ordinary Wahl totalizer by the shaft or rod on which are mounted the thirty-toothed carrying wheels of that machine, and the wheel 75 itself may correspond in size with one of those carrying wheels; that is to say, it may be a thirty-toothed gear adapted to mesh with and be driven by the master wheel 18 the same as one of the carrying wheels of a Wahl totalizer. It will be noted in Fig. 2 that the several shafts 66, 67 and 73 are so disposed about the shaft 76 as that any of the pinions 70, 71 and 74 may mesh with the gear 75 provided the latter occupies in the register an appropriate denominational position lengthwise of the shaft 76. As shown in Fig. 9, the wheel 75 is journaled on a flange 79 of a sleeve 78, which sleeve is slidably mounted on the rod 76. Motion of said gear leftward on said sleeve is prevented by a collar 80 fastened on the left-hand end of the sleeve against the flange 79 as by riveting up the end of the sleeve as shown. On its right side the gear bears against a plate 81 fastened on the sleeve 78 as for example by a force fit, being pressed up against the flange 79. Said plate 81 has an arm 82, Fig. 2, projecting downward therefrom somewhat below the general level of the register frame for a purpose to be hereinafter described. Said plate 81 also has a second arm 83 projecting downwardly and forwardly therefrom into a slot 84, Fig. 1, extending lengthwise of one of the longitudinal frame bars 47 hereinbefore referred to. The arm 83 sliding along in this slot as the sleeve 78 slides along the rod 76, guides the plate 81 against rotation about said rod as a center and compels the arm 82 to travel in a straight line. In any position of said sleeve and of the wheel 75 the latter can be turned on the flange 79 by the main master wheel 18. It will be perceived that this wheel 75 is in the nature of a traveling or jumping transmitting wheel and that in its relation to the various pinions in the register it may be regarded as a sort of auxiliary master wheel.

In Fig. 1 the wheel 75 is shown at about its extreme right-hand position in the register but normally it is at its extreme left-hand position where it may in some instances be out of gear with all of the denominational pinions of the register. In the present instance however it stands normally in engagement with the left-hand one of the pinions 70. Said jumping wheel is moved to said left-hand position and normally held there by means of a long compression spring 85 here shown as wound in a conical coil about the shaft 76. The extreme right-hand coil of this spring may conveniently be seated in a shallow flanged pan-like device 86 having at the center a hole through which the shaft 76 passes and said device pressed by the spring against the right-hand side plate 46. This spring when free to act will expand and force the wheel 75 and its mounting to the extreme left-hand position but it can be compressed to allow the wheel to move to the right-hand position shown.

The devices for controlling the sliding and jumping movements of the gear 75 cooperate with the depending arm 82 of the plate 81. A bell crank 87 is pivoted on a screw 88 to the inner face of the stationary frame bar 27 hereinbefore referred to. Said bell crank has a horizontal arm extending leftward from its pivot and having at its end a hook 90 with an abrupt right-hand face adapted when the register is traveling toward the left to arrest the plate 81 when the gear 75 is in mesh with the master wheel 18 and to hold said gear in that position during as much of the leftward travel of the carriage as is necessary to operate the mechanism of the register. The left-hand face of the hook 90 is made inclined as shown so that when the carriage is drawn back toward the right the arm 82 will depress the hook without being arrested. Said hook is held up in its normal position by means of a tension spring 91 connected at one end to a depending arm of the bell crank 87 and at the other end to a pin 92 projecting rearward from the plate 28. In order to limit the upward motion of the hook 90 the horizontal arm of said bell crank is extended downward and an ear 93 is bent off therefrom underneath the frame bar 27.

In order to cam loose the hook 90 at the proper time so as to free the plate 81 and wheel 75 from the restraint of said hook, the latter is formed with a forwardly projecting lug 94 lying in the path of a cam 95 secured to the framework of the register and having its right and left-hand ends beveled as shown in Fig. 1 so that when the cam rides over the lug 94 it will depress the hook and release the parts as described. This cam may be constructed in any suitble way. As here shown it consists of a piece of sheet metal having a reduced square end 96, Fig. 2, passing through a suitable hole in the right-hand frame plate 46 and riveted in position. This cam is so situated that in the next step of the carriage following the last position in which it is necessary to use the gear 75, which position will be hereinafter described, the hook is released and the wheel 75 allowed to jump to its left-end position in the register.

It will be perceived that the carriage of the machine is capable of an extent of travel in excess of the width of a single computing zone and in fact equal to the width of several computing zones, and that whenever in the leftward motion of said carriage the register 22 reaches the master wheel 18 the jumping wheel 75 will be arrested and will remain in engagement with said master wheel 18 during the stepping of the register through its appointed zone of travel, during which stepping the wheel 75 will come into mesh successively with the various pinions necessary to transmit its motion to the dials M and N, after which the gear 75 and its controlling devices will be released and will jump forward to their normal position in the register.

In the diagram, Fig. 8, the vertical dot-and-dash lines may be said to represent the several denominational positions of the wheel 75 in the register 22. An amount in United States money, namely $12,864.25 has been written at the top and also at the bottom ends of these lines, each digit in its appropriate denominational position. It will be perceived that the last digit of this number occupies the fourth position from the right-hand end of the series. When the register reaches this position and the last digit "5" has been entered, the computation of the symbol is complete and said symbol, in this particular instance "88", will then be indicated at the sight-openings 64. The next operation is to copy this symbol on the paper just to the right of the number 12,864.25 as shown in Fig. 7. In order to separate the symbol from the number itself the third space from the right in Fig. 8 is left blank and it is not intended that any key except the space key of the typewriter be operated in this space. When said key is operated the resulting step of the carriage brings into engagement with the wheel 75 the extreme right-hand pinion 70 which in the present construction is the one that directly engages the gear 61. In this position of the carriage the first digit of the symbol (in this instance "8") is printed. The pinion 70 is turned eight spaces with the result that it brings the dial M to zero. This stroke of the key is followed by another step of the carriage, which step brings into engagement with the gear 75 a pinion 97 fast on or integral with the shaft 73, which shaft is geared to the dial N. The second digit of the symbol (in this instance "8") is then written, which results in the dial N being rotated eight spaces, bringing said dial N also to zero. The result of the whole operation is that at the time when the balance was being written in the third column on the paper its symbol (in this instance "88") was being computed on the dials M and N; and in the act of copying this symbol onto the paper said dials were turned to zero.

It will be perceived that in order for the register to operate in the manner just described the numerals should be arranged on the dials M and N in such wise that when any particular digit is displayed on one of said dials the writing of that digit will set the dial to zero. From the preceding description of the mechanism it will be seen that this means that when the master wheel 18 is turned in the proper direction for addition and the gear 75 is in mesh with one of the pinions on the upper shaft 66 the dial M should be turned in the direction for substraction; and likewise when said gear 75 meshes with any pinion on the shaft 73 this should turn the dial N in the direction for subtraction. The result is that whenever the master wheel 18 is turning in the direction for addition it will have the effect of subtraction on the dial N; and on the dial M it will have the effect of subtraction when any of the pinions 70 is in mesh with the gear 75 and the effect of addition when any of the pinions 71 is in mesh with said gear 75. If then the dials M and N stand at zero and the number "20" be written, each of the dials will be turned two spaces in subtraction direction. This would bring the M dial to show a "9" and the N dial to show a "7" so that the symbol of "20" would be "97" which number if written in the last two denominational positions would clear the two dials, the whole motion of the dial M for the entire operation being eleven spaces in subtraction direction and of the dial N nine spaces in subtraction direction. In short, each dial would be turned through exactly a half rotation.

As the gear 75 has to move back and forth through the various pinions it is desirable that its teeth be beveled at the ends in a manner well understood in the art. As will hereinafter appear, the two trains of gears leading to the dials M and N are normally locked and as the N gearing includes a solid long pinion 74 occupying the entire width of the computed number there is no chance for the gear 75 to turn during this part of its jump back to its left-hand position. There is however a space between the long pinion 74 and the pinion 97 and in order to prevent turning of the gear 75 while it is crossing the blank space between the units of cents of a number and the M digit of the symbol the right-hand pinion 71 is widened as shown in the drawings. The width of the several pinions is such that there is no time in the travel of said gear relative to said pinions when it is entirely out of mesh with some pinion.

The M symbol or function will sometimes be equal to ten in which event the "X" will show at the sight opening 64 and in order to print the symbol and clear the dial it is necessary to have a key that will print an "X" and add ten at one stroke. The Remington accounting machine when designed to be used to compute amounts in English money is ordinarily provided with a numeral key 11 which turns the master wheel ten teeth, an actuator provided with such a key being commercially known as a Sterling actuator. When a symbol computer of the precise sort under consideration is employed, one of these Sterling actuators may be used and the type bar connected with the numeral key that adds ten would have a type on it to print an "X".

In order that the gearing in the register 22 may be normally locked against rotation and may be unlocked when it is necessary to operate said gearing, the following devices are provided:

In the upper part of the register a rock shaft 98 is journaled at its ends in the side plates 46. A dog 100 fast on said shaft has its pointed lower end adapted to enter between two of the teeth of the gear 61 of the dial M to lock said dial and with it all of the pinions 70 and 71, which pinions are geared to the gear 61. Also fast on the shaft 98 is another arm 101 having a tooth adapted to enter between two of the teeth of the gear wheel 62 of the dial N to lock said gear wheel and with it the shaft 73. Also fast on the shaft 98 near the left-hand end thereof is a third arm 102 and a rod 103 passes through perforations in said arm 102 and in a prolongation of the arm 101 and constitutes a universal bar for certain key operated devices to be presently described and which when operated can swing the shaft 98 and its several arms to position to unlock the gearing. Said shaft and dogs are normally held in engagement with the gearing by means of a spring 104 connected at one end with the arm 102 and at the other with a looped collar 105 fast on the fixed rod 55.

The rod 103 serves as a universal bar for a series of levers 106 all of which are alike and for another lever 107 which differs somewhat from the levers 106, all of said levers 106 and 107 being pivoted on a transverse frame rod 108 at the lower back part of the register. Each of the levers 106 and 107 has an arm or ear 110 which by coming into contact with the frame rod 111 limits the forward motion of the upper arms of the levers. The rods 108 and 111 occupy or may occupy about the same positions in the register that are occupied in a Wahl totalizer by the two rods on which are pivoted the levers which carry the Geneva pinions of the Wahl transfer mechanism; and each of the levers 106 and 107 is at its lower part constructed about the same as the said levers of the Wahl mechanism. That is to say, each of said levers extends downward and is forked or notched at its lower end where it is adapted to be operated by the upwardly extending arm of the master dog 30 of the machine. As shown in Figs. 2 and 4, each of the levers that stands just at the right of a blank space extends a little further downward than the others in order to lock the master dog and therefore the numeral keys whenever the register stands at one of these blank spaces, this construction being the same as in the ordinary Wahl mechanism. It is therefore impossible to operate the keys at the space next higher than the last pinion 70 at the left, in the space appropriated to the decimal point, and in the space between the units of cents and the first digit of the symbol.

Each of the levers 106 and 107 is controlled by a spring 112, all of said springs being hooked around a transverse frame rod 113, similar in position and function to a rod ordinarily used in the Wahl totalizer. Each of said levers extends upward at a forward inclination so that its upper part is just in front of the cross bar 103. In the Wahl machine the first part of the down stroke of a key swings the master dog in counterclockwise direction in Fig. 2, the succeeding part of the down stroke turns the master wheel 18 and at the end of the down stroke the universal bar of the Wahl mechanism is released and the master dog 30 returns to its normal position shown in the drawing. The locking dogs 100 and 101 will therefore be normally in locking engagement with the dial wheels, they will be moved backward to release said wheels at each key stroke just before the master wheel begins to turn, and they will be restored to locking position at the end of the down stroke of the key. The registering trains will therefore be locked at all times when the carriage is stepping or traveling and indeed at all times except during the down stroke of a numeral key.

In order to warn the operator in case the writing of the two digits of the symbol does not bring the dials M and N both to zero, various devices can be employed. In the present instance means are provided to lock up the machine in case at the end of the last key stroke the two dials are not both in zero position. To this end, each of the disks 63, one of which is mounted just at the left of each of the dials M and N, has a smooth cylindrical periphery except at two opposite points in each disk where there is a notch 114 as best shown in Fig. 3. Co-operating with these disks 63 and the notches 114 therein is a double feeler device 115 shown in detail in Figs. 5 and 6. In the form here shown this feeler device consists of two sheet metal arms 116 bent off at right-angles from a connecting cross bar 117, said arms being each perforated and pivoted loosely on the rock shaft 98. The arms 116 overlie respectively the disks 63 and each of them has a nose 118 that is pressed against the periphery of its disk 63. The construction is such that when either of said disks is in position to display a zero, one of the notches 114 registers with the nose 118 and when both disks display zeros the feeler device 115 can drop down to the position shown in Fig. 2, the noses 118 entering the notches; but if either disk is out of its zero position the device is held out in the position shown in Fig. 3. A bell crank locking lever having two arms 120 and 121 is pivoted at 122 to a post 123 projecting inward from one of the side arms 116 of the feeler. The depending arm 121 lies in an annular groove 124 cut in the shaft 73 and this arm is drawn back against said shaft; that is to say, against the bottom of said groove, by means of a tension spring 125 connected at one end to a loop of the collar 58 which is secured to the rod 55; and at its other end said spring is connected to the arm 121 at a point between the shaft 73 and the pivot 122 of said arm. The construction is such that the tension of said spring not only holds the arm 121 pressed against the shaft 73 but also acts on the feeler 115 to press its noses 118 against the disks 63. The arm 120 extends rearward from the pivot 122 and this arm is given by the mechanism just described a peculiar motion. When the feeler is engaging the notches 114 and is therefore swung toward the front of the machine the co-operation of the pivot 122 and the shaft 73 under the power of the spring 125 rocks the bell crank in such a manner that its arm 120 has an upward inclination as shown in Fig. 2, whereas if the feeler is pressed back this arm 120 is rocked downward to the horizontal position shown in Fig. 3. The special lever 107 not only extends upward in front of the universal bar 103 but it also has a rear upwardly directed branch or finger 127 so located that in the normal or zero position of the parts this finger stands beneath the upwardly inclined arm 120 but when the said arm occupies its horizontal position shown in Fig. 3 the end of the arm is in position to contact with said finger 127. When the dials are first turned from their zero positions in the computation of the symbol the arm 120 stands above the finger 127, said finger then being in its normal position shown in Fig. 2. But when a key is operated with the jumping wheel 75 in its extreme right-hand position shown in Fig. 1, the first part of the key depression moves the master dog 30 to the operated position shown in Fig. 3 and swings the lever 107 to its operated position shown in that figure. If at this time the feeler 115 is still in its pressed back position the arm 120 will snap down in front of the finger 127 and lock the lever 107 against return to its normal position. The lever 107 is provided at its lower end with a finger 128 lying behind the master dog and which in case said lever is locked as shown in Fig. 3 will prevent the return of the master dog to normal position. As is well known the construction of the Remington Wahl machine is such that when this dog is thus prevented from returning to normal position the key is also prevented from returning to normal position and, one numeral key being depressed, all of the other numeral keys of the machine are locked by the single key mechanism of the Wahl machine. Furthermore, the carriage itself is locked by the rear arm of the dog 30 engaging the rack 31 as shown in Fig. 3. The machine is therefore entirely locked against further operation and the operator is thereby warned that the two dials M and N are not both in zero position as they should be at that stage of the computation. It may be remarked that the position of the parts shown in Fig. 3 is that which the parts would ordinarily come into at the first part of the key stroke when writing the N function, when the universal bar or rocker of the Wahl mechanism has just been operated and the register wheels have not yet been turned. In case at this time the M dial already stands at zero and the balance of the key stroke restores the N dial to zero, bringing one of the notches 114 under the nose 118, then the feeler 115 will swing forward, the arm 120 will move upward and the machine will be unlocked. If on the other hand this stroke of the key fails to restore the dial N to zero the parts will remain in the position shown.

In case the machine does lock up as shown in Fig. 3 this warns the operator that some mistake has been made either in the copying of the number itself or in the copying of the symbol. Having thus warned the operator the locking mechanism has performed its function and it is then necessary for the operator to unlock it so that he may proceed to correct his error.

The means provided for unlocking the machine consists of a key or push bar 130 extending through a guide slot or hole in the front of the casing plate 65 in such position that the operator can push it toward the rear with his finger. This bar is guided at its front end by the said opening in the casing and at its rear end by the groove 124 in the shaft 73 into which groove said bar extends just in front of the lever arm 121. Between these two points the bar 130 rests on the shaft 66 into which an annular groove 131 has been turned for the purpose. When this key is pushed in it rocks the lever 120, 121 moving the arm 120 upward and releasing the lever 107 which immediately snaps forward to its normal position, thus unlocking the machine. The key 130 is restored to its normal forward position by the spring 125, acting through the lever arm 121. Its motion forward is limited by a lug 132 on said key and engaging the inner surface of the casing plate 65.

In the present application of the invention the symbol computers 22 and 23 occupy in the Remington Wahl accounting machine the positions that would ordinarily be occupied by two dummies, that is, two totalizer frames with no mechanism in them; and it is therefore necessary to provide in each of said computing registers means for picking up the hook 38 that controls the cross truck 35. To this end a transverse frame bar 133 is provided in the lower rear part of each register, being secured at its ends to the side plates 46 as for example by screws, holes 134, Fig. 2, being provided for this purpose. At a suitable point in its length the bar 133 has a lug 135 depending therefrom in position to pick up the hook 38 so as to draw along the cross totalizer 36 in denominational harmony with the symbol computer. The construction of the Wahl mechanism is such that in that step of the carriage which immediately follows the writing of the units of cents digit the hook is cammed loose and the cross truck is allowed to jump back to the right. If said truck were allowed to go clear back to its normal position it would strike the lever 41 and throw in a certain key lock provided in the Wahl machine and thus prevent the operation of the keys to write the two digits of the symbol. In order to prevent this lock from operating at this time the bar 133 has a second lug 136 extending downward therefrom which catches the hook 38 and prevents the cross truck from locking up the machine. This lug 136 is so situated that the cross truck will be cammed loose from it in that step of the carriage which immediately follows the writing of the N digit of the symbol.

From the construction just described it will be seen that during the writing of the two digits of a symbol the cross truck is hooked up to the symbol computer and unless means were taken to prevent it the said two digits would be registered in the cross totalizer 36.

In order to prevent this, the cam 45, Fig. 7, on the front of the register 22, is made of the peculiar form shown; that is to say, said cam, throughout that part of its length which corresponds to the number representing the new balance, is of a depth to set the cross footing mechanism for subtraction, but the right-hand part 137 of said cam is of middle depth so that during the time when the two digits of the symbol are being written the cross-footing mechanism is set at disconnect and is therefore not affected by these two digits. Similarly the symbol computing register 23 which computes the symbol of the pick-up balance has the main part of its cam 138 at an elevation to set the cross-footing mechanism for addition but the right-hand part 140 of said cam is of middle depth to disconnect the cross footer.

The use of the two separate registers 22 and 23 remains to be explained. When after computing a new balance in the cross totalizer 36, said new balance is to be written in the third column on the ledger sheet the cam 45 automatically sets the cross calculating mechanism for substraction so that the act of writing the balance clears the cross totalizer and at the same time the act of writing said balance computes its symbol which will be displayed at the sight-openings 64 of the register 22. This symbol is then copied from the dials M and N which if correctly done automatically sets said dials to zero, ready for a new computation.

When this ledger sheet again comes up in the course of the work to have entered it in one or more new transactions, the first operation is to copy in the fourth column the balance last computed and entered in the third column. At this time the cam 138 automatically sets the cross calculating mechanism for addition so that the act of copying the old balance adds said balance into the cross totalizer 36 and at the same time the symbol appropriate to that balance is computed in the register 23. The operator then immediately copies from the third column of the paper the symbol there recorded. This will, of course, be the same symbol that has just been computed in the register 23 and the copying of it will restore the M and N dials of said register 23 to zero, provided the number and its symbol have been copied correctly. If one or the other of them has not been copied correctly then the dials will not be restored to zero and the machine will be locked up and the operator will thus be notified of his error in copying the numbers. It is this register 23 then which performs the intended function of the mechanism, namely, to notify the operator in case he has incorrectly copied a number from the paper. In order for it to perform this function however it was necessary that the symbol appropriate to that number shall have been computed and printed on the paper when the old balance was originally written in the third column and this necessary function is performed by the register 22.

The mechanism, could of course fail entirely of its function if the operator, instead of copying the symbol from the third column of the paper at the same time that he copies the old balance, should copy the symbol not from the paper but from the register 23. In this event if he did copy it from the register 23 the dials M and N of that register would come to zero even though the number had been incorrectly copied from the paper. It is therefore preferable that the dials M and N do not show any numbers and in fact these dials would perform their function if they were entirely invisible, and this register may be so constructed if prefered as not to show the dials M and N. It might happen, however, that an operator by making mistakes in copying would get the dials of the register 23 displaced from zero position and if said dials were invisible it might be a considerable undertaking ever to get them both back to their proper positions. For this reason I prefer to provide the sight-openings 64 in the register 23 but not to number the dials M and N in said register. Instead of numbering said dials each of them has thereon two spots of a distinctive color which spots mark the zero positions of the dials. If both dials stand at zero these color spots show through the sight-openings but if they do not stand at zero nothing is seen there except the unlettered peripheries of the dials. It is therefore impossible for the operator to copy the symbol from these dials. In case, however, he ever gets them disarranged he can restore them to proper position by suitably setting the carriage and striking the "1" key repeatedly until the red spot shows at the sight-opening 64, thus restoring the register to condition for resuming operations.

In my prior application Sr. No. 515,887, hereinbefore referred to, I have shown, described and claimed similar computing registers designed for the same use and in the same situation in the Wahl mechanism as the registers 22 and 23 of the present case. The registers shown in said application have two dials for the M and N functions, although they do not compute the 11 and 9 functions as in the present machine. My prior registers have the locking mechanism comprising the feelers 115, lever 120, 121 and lever 107 and the release key 130 all in forms substantially similar to those shown in the present case. Said registers also have the equivalent of the cross bar 133 with its lugs 135 and 136 and they have cams similar to the cams 45 and 138. The register shown in said prior application does not, however, have the jumping wheel 75 nor any of the other features constituting the subject-matter of the claims of this present application. My prior application contains broad claims for symbol computing registering mechanism and many of the claims of that application read on the mechanism shown in the present application; but none of the claims of the present application reads on the mechanism of said prior application.

Various changes may be made in the details of construction and arrangement without departing from my invention.

What I claim as new and desire to secure by Letters Patent, is,

1. In a calculating machine, the combination of a stationary master actuator, a traveling register, and a jumping master wheel in said register, said master wheel being adapted for engagement with said stationary actuator and to operate successively the denominational wheels of the register as said register travels past said stationary master actuator.

2. In a calculating machine, the combination of a stationary master actuator, a traveling register, and a jumping master wheel in said register, said master wheel being adapted for engagement with said stationary actuator and to operate successively the denominational wheels of the register as said register travels past said stationary master actuator, and said jumping master wheel being adapted then to return to its normal position within the register.

3. In a calculating machine, the combination with an actuator or master wheel, of a relatively traveling register provided with an independent jumping master wheel.

4. In a calculating machine, a register having a master wheel adapted to operate the denominational wheels of said register seriatum, said master wheel at the end of its operations being adapted to travel back to its normal position without affecting said denominational wheels, and means for actuating said register master wheel, said register with its master wheel traveling relatively to said actuating means and said actuating means being adapted to actuate said jumping master wheel only when the two are in alignment.

5. In a calculating machine, the combination of a stationary master actuator, a traveling carriage, a register on said carriage adapted to approach said actuator, a jumping master wheel in said register adapted when it reaches the stationary actuator to engage therewith and remain in engagement while the denominational portion of the register travels with the carriage, and said master wheel being adapted to disengage from said actuator and to jump to normal position in the register and to travel therewith to the end of the carriage travel.

6. In a calculating machine, the combination with a stationary actuator, of a traveling register having a jumping master wheel, said master wheel halting in engagement with said actuator while said register is traveling past said actuator and subsequently traveling on with said register beyond said actuator.

7. In a calculating machine, the combination with an actuator and a relatively traveling symbol computing register, said register having therein a jumping wheel operated by said actuator, and means operated by said jumping wheel for computing a symbol while said jumping wheel is in engagement with said actuator.

8. In a calculating machine, the combination with an actuator, of a relatively traveling register, said register comprising a dial, a jumping wheel, and means whereby said jumping wheel transmits to said dial the motion of said actuator corresponding to a plurality of the digits of a number.

9. In a calculating machine, a symbol computing register comprising a dial having thereon eleven characters that can be displayed to show the position of the dial, and means connected with said dial for computing the 11-function of a number.

10. In a calculating machine, a symbol computing register having therein two dials, one of which has a multiple of eleven characters and the other of which has a multiple of nine characters adapted to be displayed to show the positions of said dials, and means connected with said dials to compute the 11-function and the 9-function of the number.

11. In a calculating machine, the combination with actuating means, of a function computing register having therein two dials to display the 9- and the 11-functions of a number, a jumping master wheel, and gearing comprising a gear shaft connected with the 9-dial and adapted to be turned in the same direction by said jumping wheel in every denominational position of the latter, and other gearing connected to the 11-dial and including two shafts geared together, and pinions on said two shafts alternating with one another whereby said 11-dial is turned in opposite directions at alternate denominational positions of said jumping wheel.

12. A calculating machine having as elements thereof an actuator and a register, one of said elements traveling relatively to the other and said register having its individual jumping master wheel which maintains a fixed relation to the register when inactive, and which maintains a fixed relation to said actuator and a traveling relation to its register when active.

13. A calculating machine having as elements thereof an actuator and a register, one of said elements traveling relative to the other, said register having its individual jumping master wheel which normally maintains a fixed relation to said register and is inactive to transmit to said register the motion to said actuator, and means for temporarily coupling said master wheel to the actuator element to give to said wheel a fixed relation to said actuator element and a traveling relation to its register to render said master wheel active to transmit to its registering mechanism the motion of said actuator.

14. In a calculating machine, the combination with a register frame and an actuator, one having traveling relation to the other, of denominational wheels and a jumping wheel in said register frame, means for causing said wheel to traverse said register step-by-step whereby said wheel may transmit to said denominational wheels the motion of said actuator in a plurality of denominational positions, and means for restoring said jumping wheel to normal position relative to said register frame.

15. In a calculating machine, the combination with a master actuator and a register frame, one traveling relative to the other, registering mechanism and a jumping wheel in said register frame, said jumping wheel during the operation of said actuator in accordance with the digits of one number maintaining a fixed relation to said register frame out of engagement with said actuator, and said jumping wheel during the opperation of said actuator in accordance with the digits of another number being kept in engagement with said actuator so as to operate said registering mechanism in one denominational position after another.

16. A calculating machine having as elements thereof an actuator and a plurality of registers, one of said elements traveling relative to the other, each register having its individual jumping master wheel which maintains a fixed relation to the register when inactive, and which maintains a fixed relation to said actuator and a traveling relation to its register when active.

17. A calculating machine having as elements thereof an actuator and a plurality of registers, one of said elements traveling relative to the other, each register having its individual jumping master wheel which normally maintains a fixed relation to said register and is inactive to operate said register, and means for temporarily coupling one of said master wheels to the actuator element to give to said wheel a fixed relation to said actuator element and a traveling relation to its register to render said master wheel active to operate its register.

18. In a calculating machine, the combination with a register frame and an actuator, one having traveling relation to the other to an extent greater than the width of a computing zone of denominational wheels and a jumping wheel in said register frame, said jumping wheel having in and relative to said frame an extent of step by step travel as great as the width of a computing zone, means for causing said wheel to traverse said register step by step whereby said wheel may transmit to said denominational wheels the motion of said actuator in a plurality of denominational positions, and means for restoring said jumping wheel to normal position relative to said register frame.

19. In a calculating machine, the combination with an actuator and a register frame one having travel relative to the other to an extent greater than the width of a computing zone, registering mechanism in said register frame, a jumping wheel in said register frame, said jumping wheel having in and relative to said frame an extent of travel as great as the width of a computing zone, and said wheel normally bearing a fixed relation to said register frame, means for causing said jumping wheel temporarily to maintain a fixed relation to said actuator and a traveling relation to said register frame to the extent of the width of a computing zone, and means for restoring said jumping wheel to normal relation to said register frame.

20. In a calculating machine, the combination with an actuator and a register frame, one having relative to the other an extent of travel greater than the width of a computing zone, of registering mechanism and a jumping wheel in said register frame, said jumping wheel normally bearing a fixed relation to said frame and registering mechanism, and means for temporarily causing said jumping wheel to maintain a fixed relation to said actuator and a traveling relation to said register frame and registering mechanism to the extent of the width of a computing zone.

21. In a calculating machine, the combination with an actuator and a register frame, one having relative to the other an extent of travel greater than the width of a computing zone, of registering mechanism and a jumping wheel in said register frame, said jumping wheel normally bearing a fixed relation to said frame and registering mechanism, means for temporarily causing said jumping wheel to maintain a fixed relation to said actuator and a traveling relation to said register frame and registering mechanism to the extent of the width of a computing zone, and means for locking said registering mechanism and said jumping wheel against rotation during relative traveling motion between said register frame and said actuator.

22. In a calculating machine, the combination with an actuator, of a symbol computing register containing one or more dials on which a symbol may be registered, denominational gearing geared to said dial or dials, a jumping wheel in said register having therein an extent of travel as great as the width of a computing zone including a number whose symbol is to be computed and one or more positions corresponding to the symbol, and means for notifying the operator of the machine in case the operation of said actuator, jumping wheel and registering mechanism in the spaces last mentioned do not bring said dials to zero.

23. In a calculating machine, the combination with an actuator and a traveling register frame having denominational devices therein, of the jumping wheel 75 in said frame, the spring 85 tending to hold said wheel at one side of said register frame, the stationary hook 90 for arresting said wheel 75 to bring one after another of the denominations of said registering mechanism into gear with said wheel, and the cam 95 in said register frame for releasing said hook.

24. In a calculating machine, the combination with a master wheel and a register frame one having relative to the other an extent of travel greater than the width of a computing zone, of a jumping wheel in said register frame, said jumping wheel having in and relative to said frame an extent of travel as great as the width of a computing zone, and means for keeping the two said wheels in engagement through a computing zone.

25. In a calculating machine, a symbol computing register containing one or more dials on which a symbol may be registered, denominational gearing geared to said dials, and a jumping wheel in said register having therein an extent of travel as great as the width of a computing column, a master wheel, means for causing a relative travel between said register and said master wheel to an extent greater than the width of a computing zone, and means for holding said jumping wheel in engagement with said master wheel throughout a computing zone and then moving said wheels out of engagement.

26. In a calculating machine, the combination with a traveling carriage, a master wheel, and one or more totalizers mounted on said traveling carriage and adapted to travel past said master wheel, of a symbol computing register also mounted on said traveling carriage and having therein a jumping wheel adapted to move into engagement with said master wheel at the beginning of a computing zone, means for holding said jumping wheel in engagement with said master wheel throughout said zone, and means for releasing said holding means at the end of said zone to allow said register to travel on with said carriage beyond said zone.

27. In a calculating machine, the combination with a master wheel and a register frame, one traveling relative to the other to an extent greater than the width of a computing zone, denominational wheels in said register frame, a jumping wheel in said register frame, a spring normally holding said jumping wheel at one side of said frame, means for arresting the travel of said jumping wheel when it comes into engagement with the master wheel and holding it in such engagement throughout the computing zone, and a trip for releasing said holding means.

28. A symbol computing register comprising a dial, a gear shaft geared to said dial, a jumping wheel normally at one end of said register, means for imparting a relative step-by-step movement between said jumping wheel and the balance of said register, said gear shaft gearing with said wheel in a plurality of denominational positions, and means for restoring said jumping wheel to its normal position in said register.

29. In a calculating machine, a symbol computing register comprising a dial, a gear shaft operatively connected with said dial and of a length as great as the width of a computing zone, a jumping wheel in said register normally at one side thereof, means for imparting a relative step-by-step movement between said jumping wheel and said register, said jumping wheel gearing with said shaft in every denominational position of said zone whereby the nine function of a number may be computed on said dial, means for turning said jumping wheel, and means for restoring said jumping wheel to its normal position in said register.

30. In a calculating machine, a symbol computing register comprising a dial, two gear shafts geared together to turn in opposite directions and one of them operatively connected to said dial, a jumping wheel in said register, and means for imparting a relative step-by-step movement between said jumping wheel and the balance of said register, said gear shafts having gears thereon in different denominational positions, only one gear in each such position, and each gear meshing with said jumping wheel when the latter is in its denominational position whereby said dial is turned in one direction in correspondence to some of the digits of a number and in the opposite direction in correspondence to other digits of such number.

31. In a calculating machine, the combination with differential mechanism, of a symbol computing register comprising a dial, a gear shaft operatively connected with said dial and having thereon pinions in various denominational positions, a jumping wheel in said register, means for imparting a relative step-by-step movement between said jumping wheel and the balance of said register, said wheel gearing with said pinions one after another whereby there is computed on said dial a symbol of certain at least of the digits of the number, and an additional pinion outside of the range of the number whose symbol is computed and with which additional pinion said jumping wheel is adapted to mesh in order to clear said dial.

32. In a calculating machine, the combination with a master wheel and a register frame having an extent of relative travel as great as a plurality of computing zones, of one or more dials in said register, pinions in different denominational positions of the computing zone, said pinions geared according to a definite scheme to said dial or dials, a jumping wheel in said register frame normally at one side thereof but adapted to mesh with said pinions each in its appropriate denominational position, an additional pinion for each dial outside of the zone of the number whose symbol is computed, means for holding said jumping wheel in mesh with said master wheel throughout the extent of the zone of said number and for enough additional travel to bring it into mesh with said additional pinion or pinions, and means for releasing said jumping wheel and restoring it to its normal position in said register, whereby a symbol may be computed of the digits of a number and whereby when said jumping wheel is in mesh with said additional pinion or pinions said dials may be cleared.

33. In a calculating machine, two visible dials for calculating and displaying the 9-function and the 11-function respectively, the "9" dial having nine markings thereon and the "11" dial having eleven markings.

Signed at the borough of Manhattan, city of New York, in the county of New York, and State of New York, this 24th day of November, A. D. 1922.

ARTHUR F. POOLE.

Witnesses:
LILLIAN NELSON,
CHARLES E. SMITH.